United States Patent
Dettloff et al.

[15] 3,638,552
[45] Feb. 1, 1972

[54] AUTOMOBILE TRUNK LID WITH VENTILATION MEANS

[72] Inventors: Richard L. Dettloff, Harper Woods; Victor Hlavaty, Royal Oak, both of Mich.

[73] Assignee: General Motors Corporation, Detroit, Mich.

[22] Filed: Sept. 9, 1970

[21] Appl. No.: 70,861

[52] U.S. Cl. ............................................. 98/2.18
[51] Int. Cl. ............................................ B60h 1/24
[58] Field of Search ..................... 98/2, 2.05–2.08, 98/2.14–2.18

[56] References Cited

UNITED STATES PATENTS

| | | | |
|---|---|---|---|
| 3,274,915 | 9/1966 | Ziegenfelder | 98/2.18 |
| 3,286,617 | 11/1966 | Shirk | 98/2.18 |
| 3,329,078 | 7/1967 | De Castelet | 98/2.18 |

*Primary Examiner*—Meyer Perlin
*Attorney*—W. S. Pettigrew, J. C. Evans and K. H. MacLean, Jr.

[57] ABSTRACT

In preferred form, a trunk compartment deck lid for an automobile having a two-way ventilation system for the passenger compartment including an opening to atmosphere through the exterior of the automobile. The deck lid has spaced interior and exterior panels with an opening to atmosphere in the exterior panel and openings to the trunk compartment in the interior panel. Ribs formed in the interior panel and offset toward the exterior panel provide a curved flow path for separating water flow from airflow and causing the water to collect in a troughlike space near the rear edge of the deck lid. The ribs extend laterally between the troughlike space and the openings in the interior panel to prevent movement of water into the trunk compartment upon deceleration of the automobile.

4 Claims, 4 Drawing Figures

INVENTORS.
Richard L. Dettloff, &
BY Victor Hlavaty
K. H. MacLean, Jr.
ATTORNEY

INVENTORS.
Richard L. Dettloff, &
BY Victor Hlavaty

K. H. MacLean, Jr.
ATTORNEY 3,638,552

AUTOMOBILE TRUNK LID WITH VENTILATION MEANS

This invention relates to a trunk compartment deck lid having spaced interior and exterior panels with openings therein for defining a flow path for a ventilation system of the passenger compartment.

In automobile ventilation systems having an opening to atmosphere which allows air to flow into the passenger compartment, provision must be made for separating airflow from waterflow to prevent the entry of water into the interior of the automobile. The subject trunk compartment deck lid includes spaced interior and exterior panels which define a flow path therebetween for the ventilation system. An opening in the exterior panel to atmosphere and openings in the interior panel to the trunk compartment permit air to flow between the atmosphere and the passenger compartment in response to a pressure differential therebetween. When this pressure differential causes air to flow from atmosphere into the passenger compartment, water may be drawn in with the ventilating air. The subject invention has ribs formed in the interior panel offset toward the exterior panel to cause the ventilating air to follow a curved path from the opening to atmosphere to the openings to the trunk compartment. This curved flow path separates water flow from airflow. A troughlike space adjacent the deck lid's rear edge collects this water. The ribs laterally extend between the openings to the trunk compartment and the water trough to prevent the movement of water through the openings when the automobile is decelerated.

An object of the present invention is to provide a trunk compartment deck lid for an automobile having spaced interior and exterior panels with openings therethrough to the trunk compartment and to atmosphere respectively for providing airflow in either direction between atmosphere and the trunk compartment and with ribs in the interior panel located about the openings to cause air to follow a curved flow path between the openings for water separation and to block movement of water forward into said trunk compartment through the openings upon automobile deceleration.

A still further object of the present invention is to provide a trunk compartment deck lid for an automobile having spaced interior and exterior panels with openings therethrough to the trunk compartment and to atmosphere respectively for providing airflow in either direction between atmosphere and the trunk compartment, with a water-collecting trough-shaped spaced adjacent the rear edge of the deck lid and with ribs in the interior panel offset toward the exterior panel and extending from the opening to atmosphere, past the openings to the trunk compartment and between the water trough and the openings to the trunk compartment both to cause air to follow a curved flow path for water separation and to prevent movement of water forward into said trunk compartment through these openings upon automobile deceleration.

Further objects and advantages of the present invention will be apparent from the following detailed description, reference being had to the accompanying drawings wherein a preferred embodiment of the present invention is clearly shown.

Figure 1:
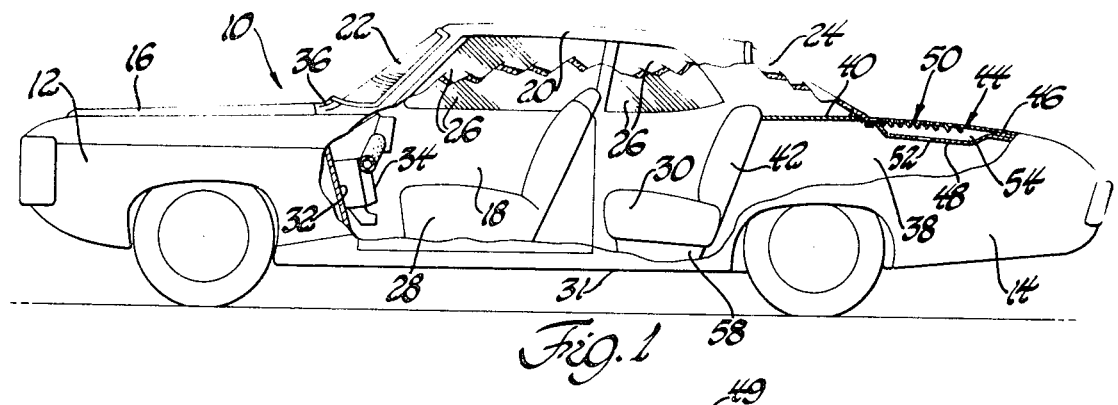
FIG. 1 is a vertical side view of an automobile broken away to reveal the passenger and trunk compartments.

In FIG. 1 of the drawings, an automobile 10 is illustrated. It includes a forward portion 12 and a rearward portion 14. The forward portion 12 includes a hood 16 which covers the automobile's internal-combustion engine (not shown). Between forward portion 12 and the rearward portion 14 is a passenger compartment 18. The passenger compartment 18 is partially closed by a roof or top 20, a front windshield 22, a rear windshield or backlight 24, and a plurality of side windows 26. The side windows 26 can be opened at will by the automobile's occupants. A front seat 28 and a rear seat 30 are attached to the floor 31 of the passenger compartment 18 for passenger seating.

The passenger compartment 18 is separated from the engine by a firewall 32 which supports an air admission means 34 for introducing air under pressure into the passenger compartment 18. The air admission means 34 includes a fan (not shown) which draws air from the atmosphere through grill inlets 36 and pumps the air into the passenger compartment 18. A heater core on an evaporator core (neither visible) within the air admission means 34 conditions the air to achieve a predetermined temperature and humidity within the passenger compartment 18.

The rearward portion 14 of the automobile 10 encloses a trunk compartment 38 which is separated from the passenger compartment 18 by a package shelf 40 and the seat back 42 of rear seat 30. The trunk compartment 38 is partially covered by a deck lid 44 which pivots along its front edge to provide access to the trunk compartment 38.

Figure 2:
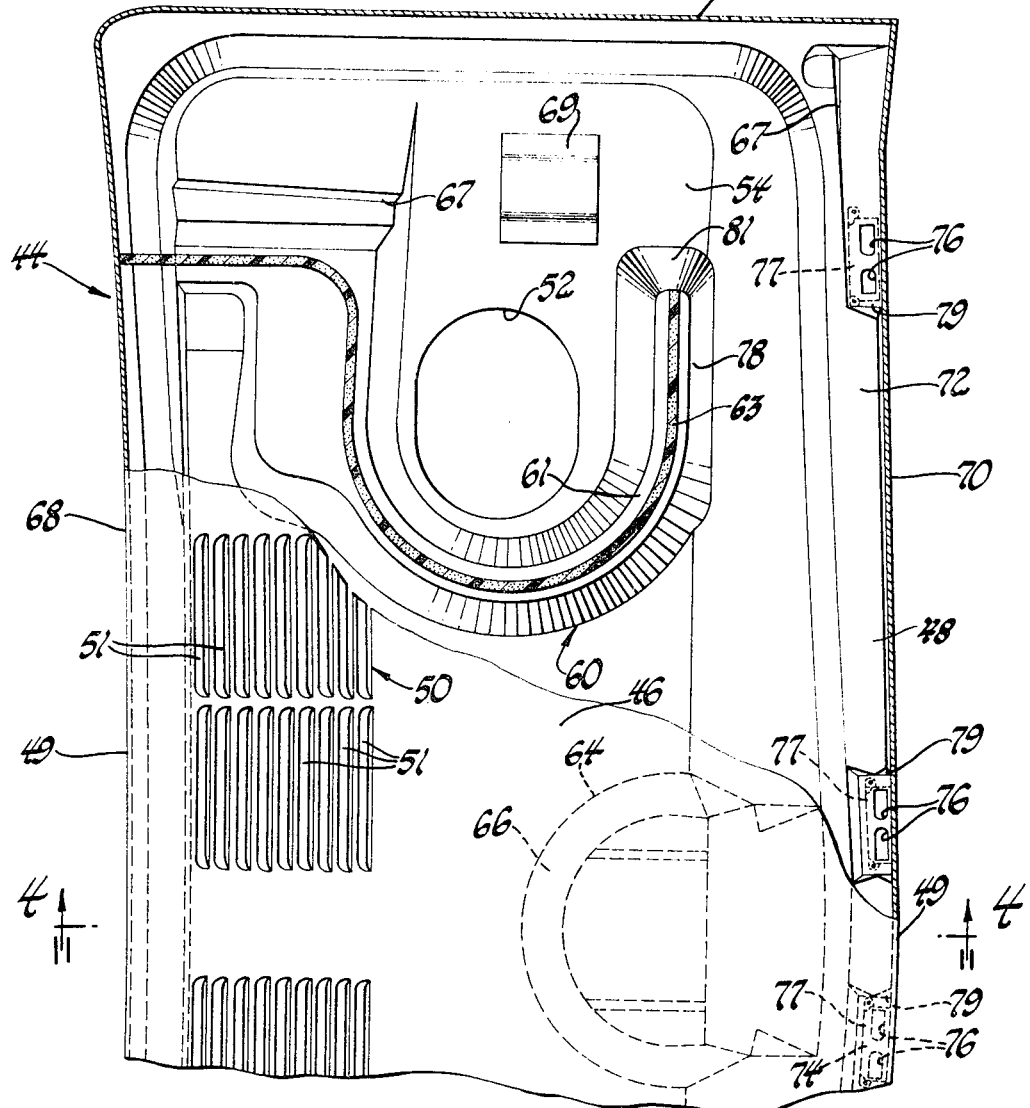
FIG. 2 is a horizontal view of the automobile trunk compartment deck lid partially broken away.
Figure 3:
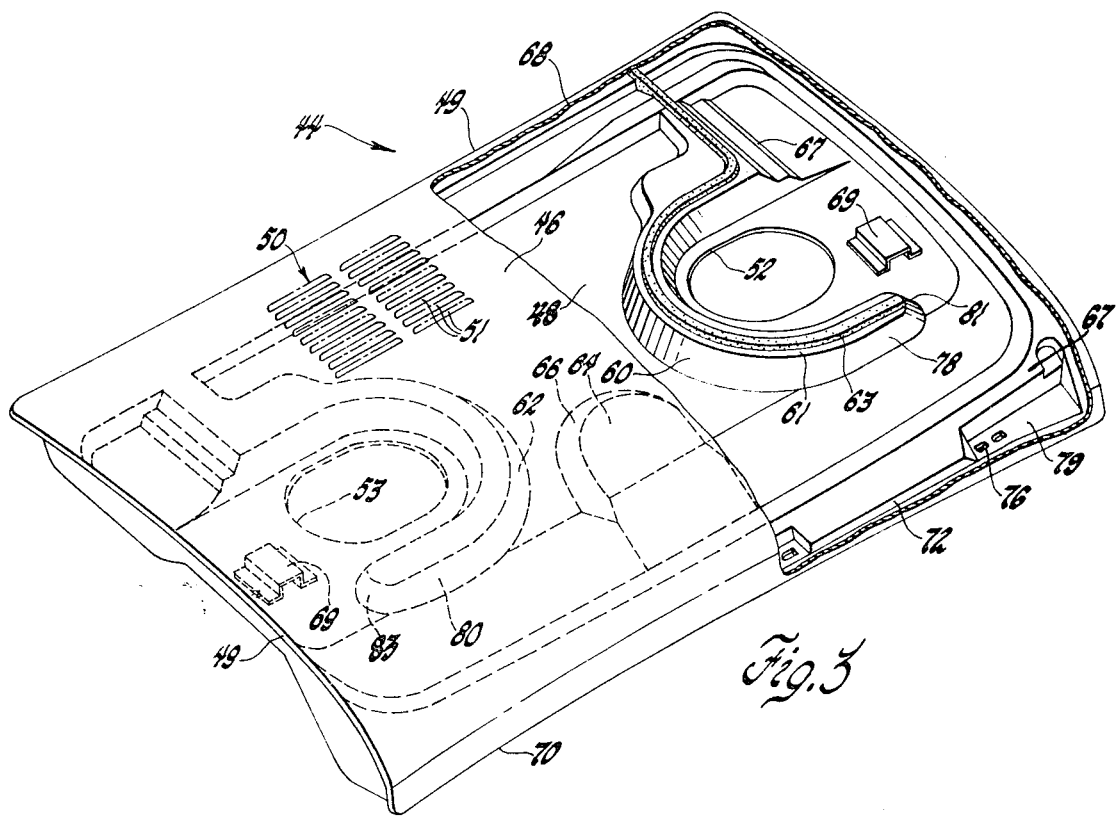
FIG. 3 is a perspective view of the automobile trunk compartment deck lid partially broken away.
Figure 4:
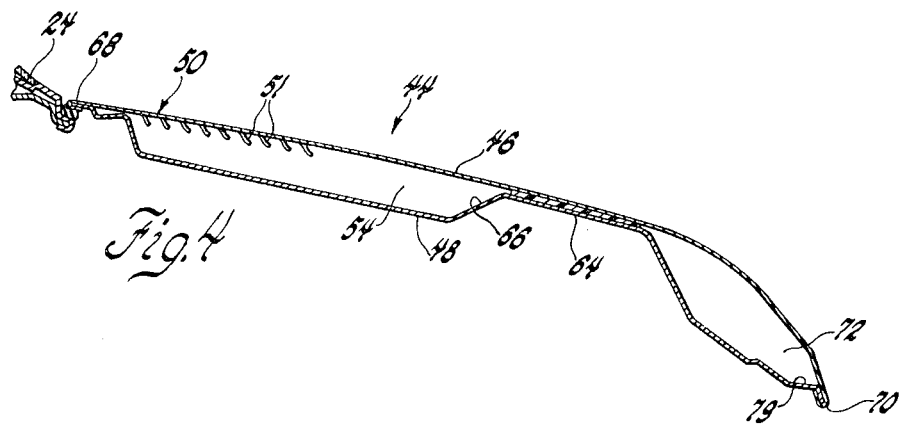
FIG. 4 is a vertical sectioned view of the deck lid taken along section line 4—4 in FIG. 2 and looking in the direction of the arrows.

The deck lid 44, as best shown in FIGS. 2, 3 and 4, includes a spaced outer or exterior panel 46 and an inner or interior panel 48. Panels 46 and 48 are joined together along their peripheries 49 by crimping or other suitable means. An opening 50 extends through the exterior panel 46 to atmosphere in the form of multiple slots 51 across the deck lid 44 as seen in FIG. 2.

Two openings 52 and 53 extend through the interior panel 48 into the trunk compartment 38. A deck lid flow path 54 between the spaced panels 46 and 48 communicates the opening 50 with openings 52 and 53. Together the opening 50, the deck lid flow path 54, and the openings 52 and 53 interconnect the trunk compartment 38 with the atmosphere. An opening 58 beneath rear seat 30 communicates the passenger compartment 18 and the trunk compartment 38. Thus, in the particular embodiment of the invention shown in the drawings, an air passage extends between the passenger compartment 18 and atmosphere through opening 58, trunk compartment 38, openings 52 and 53, the deck lid flow path 54 and opening 50. This air passage conducts an uninhibited airflow alternately in either direction between the passenger compartment 18 and the atmosphere.

"Uninhibited" as used in this application refers to the absence of valving or similar unidirectional flow control means in the air passage. It is realized that a degree of resistance to airflow is inherent in any passage means and thus the use of the word "uninhibited" excludes this consideration.

As best seen in FIGS. 2, 3 and 4, a rib 60 in the interior panel 48 is offset toward panel 48 and forms a wall separating the opening 50 from the opening 52. The top surface 61 of rib 60 is connected to the exterior panel 46 by an adhesive strip 63. The rib 60 extends rearwardly with respect to the automobile from the opening 50 toward the rear of the deck lid 44 and past the opening 52. A similar rib 62 adjacent the other side of the opening 50 extends rearwardly past the opening 53 to separate opening 50 and opening 53. A divider member 64 likewise formed in the interior panel 48 defines a curved surface 66 which causes air flowing from opening 50 to pass either to the right or to the left toward openings 52 and 53 respectively.

The interior panel 48 is somewhat rigidified by the offset portions 67 shown in FIG. 2. These portions 67 as well as the ribs 60 and 62 direct air between the opening 50 and 52, 53. In addition, offset members 69 connect the panels 46 and 48 to prevent undesirable movement therebetween.

The opening 50 of deck lid 44 is generally located laterally centrally to the rear of a front edge portion 68 of the deck lid 44. The front edge portion 68, as best seen in FIG. 4, is elevated with respect to a rear edge portion 70 and the interior panel 48 of the deck lid slopes downward from the front edge to the rear edge. Water separated from an airflow through the deck lid flow path 54 naturally drains toward the rear edge portion 70 where it is collected in trough-shaped spaces 72, 74 on either side of the divider member 64. Outlets 76 which are normally covered by flap valves 77 in recessed portions 79 of troughs 72 and 74 drain the water from between the panels 46 and 48 to the outside of the automobile.

The rib 60 generally extends rearwardly from opening 50 past opening 52 to cause air flowing from opening 50 to opening 52 to curve. A portion 78 of the rib 60 extends laterally between the opening 52 and the water-collecting trough 72. The portion 78 curves past the opening 52 which causes air to flow around its outer end 81. In a similar manner, a portion 80 of rib 62 on the other side of the deck lid extends between the trough 74 and the opening 53 to cause air to flow around its outer end 83.

Air passing from atmosphere through opening 50, the deck lid flow path 54 and through openings 52, 53 must take a circular path around ribs 60 or 62. The divider member 64 serves to direct air either to opening 52 or opening 53. The air's change in direction causes rainwater in the air to collect in the troughs 72 or 74. Although outlets 76 are provided to drain the water, a quantity of water may collect in the troughs. The lateral portions 78 and 80 of the ribs prevent movement of this water forward into the trunk compartment through the openings 52 and 53 upon deceleration of the automobile 10. When the automobile 10 is decelerated, water from the troughs is blocked by the rib portions 78, 80 and is thus prevented from entering the trunk compartment.

The opening 50 extends laterally across the automobile 10 as shown in FIG. 2. In addition, opening 50 is located on the deck lid 44 in a substantially neutral pressure area as herein defined. The neutral pressure area is produced by airflow over the exterior surface of the automobile 10 caused by automobile movement. For a more detailed treatment of the two-way ventilation system including a disclosure of the air pressure profile on a particular moving automobile and airflow data, reference is made to U.S. Ser. No. 28,641 filed Apr. 15, 1970 and assigned to General Motors Corporation.

When the side windows 26 of the automobile 10 are closed, positive air pressure is built up within the passenger compartment 18 by the fan of the air admission means 34 which pumps air into the passenger compartment. The positive pressure level within the passenger compartment 18 caused by this introduction of air by a fan is partially dependent on vehicle speed. The present ventilation system reduces high positive pressure levels in the passenger compartment by an exhaust flow through the opening 58 into the trunk compartment 38, through openings 52 and 53, through the deck lid flow path 54 and the opening 50 to atmosphere. Because the opening 50 is located in a neutral pressure area on the automobile body, the positive pressure within passenger compartment 18 causes air to flow from the passenger compartment 18 to atmosphere.

It has been observed that when a side window 26 of the automobile 10 is partially opened resultant airflow out the opened window tends to produce a negative pressure level in the passenger compartment 18 with respect to atmospheric pressure. The present ventilation system reduces negative pressure levels by a backflow of air from the atmosphere, through the opening 50, through the deck lid flow path 54, through openings 52 and 53, through trunk compartment 38, and through the opening 58 into the passenger compartment 18. Because the opening 50 is located in a neutral pressure area on the automobile body, the negative pressure in the passenger compartment 18 causes air to flow from the atmosphere into the passenger compartment 18. This maintains the passenger compartment 18 at a pressure level more positive than would otherwise be the case.

While the embodiment of the present invention as herein described constitutes a preferred form, it is to be understood that other forms may be adopted.

What is claimed is as follows:

1. An automobile having a ventilation system comprising: means defining a passenger compartment including a side window that may be opened or closed at will; air admission means for introducing air under pressure into the forward portion of said automobile passenger compartment; a trunk compartment rearward of said passenger compartment and divided therefrom by a passenger seat; a trunk compartment deck lid covering said trunk compartment and having spaced interior and exterior panels which define a deck lid flow path therebetween; passageway means from the interior to the exterior including said deck lid flow path for defining an air passage effective to conduct a substantially uninhibited flow of air in either direction between the atmosphere and said passenger compartment; said passage means including an opening to the atmosphere in a neutral pressure area on the deck lid as produced by airflow over said exterior panel during automobile movement; said passage means including an opening in said interior panel of said deck lid to said trunk compartment; said passage means further opening into said passenger compartment from said trunk compartment beneath the rear passenger seat whereby with said side window open air flows from both said air admission means and said passage into the passenger compartment and out said side window; means between said interior and exterior panels of the deck lid for separating airflow from waterflow; means adjacent the rear edge of said deck lid for collecting separated water between said panels; said separation means including a rib in said interior panel extending rearwardly from said exterior panel opening, past said interior panel opening and laterally between said interior panel opening and said water-collecting means to provide a curved flow path for separating waterflow from airflow and to prevent the forward movement of water through said interior panel opening upon deceleration of said automobile.

2. In a ventilation system for an automobile passenger compartment of the type having an uninhibited airflow path between the atmosphere and said passenger compartment, an opening to atmosphere in the exterior of the automobile located in a neutral pressure area as produced by airflow during automobile movement to allow alternate two-way airflow into or from said passenger compartment in response to a pressure differential between atmosphere and the passenger compartment, the improvement comprising: a trunk compartment rearwardly of said passenger compartment; a trunk compartment deck lid covering said trunk compartment and having spaced interior and exterior panels which define a deck lid flow path therebetween; said interior panel sloping downward from a front edge portion to a rear edge portion of said deck lid; said opening to atmosphere being through said exterior panel of said deck lid and rearward of said front edge portion; an opening to said trunk compartment through said interior panel of said deck lid; a water-collecting trough formed along the rear edge portion of the deck lid between said panels at an elevation below said openings; water separation means including a rib formed in said interior panel and offset toward said exterior panel of said deck lid for providing a curved airflow path between said panel openings to separate waterflow from airflow; said rib extending rearwardly from said opening to atmosphere, past said opening to said trunk compartment and extending laterally between said water-collecting trough and said opening to said trunk compartment to prevent the movement of water from said trough through said opening and into said trunk compartment upon deceleration of said automobile.

3. In a ventilation system for an automobile passenger compartment of the type having an uninhibited airflow path between the atmosphere and said passenger compartment, an opening to atmosphere in the exterior of the automobile located in a neutral pressure area as produced by the airflow during automobile movement to allow alternate two-way airflow into or from said passenger compartment in response to a pressure differential between atmosphere and the passenger compartment, the improvement comprising: a trunk compartment rearwardly of said passenger compartment, a trunk compartment deck lid covering said trunk compartment and having spaced interior and exterior panels which define a deck lid flow path therebetween; said interior panel sloping downward from a front edge portion to a rear edge portion of said deck lid; said opening to atmosphere being through said exterior panel of said deck lid and laterally centrally located on said deck lid rearward of said front edge portion; dual openings to said trunk compartment extending through said interior panel of said deck lid and located laterally to either side of said opening to atmosphere; a water-collecting trough formed along the rear edge portion of said deck lid between said panels at an elevation below said openings; water separation means including ribs formed in said interior panel and offset toward said exterior panel of said deck lid for providing two curved airflow paths between said opening to atmosphere and said openings to said trunk compartment to separate waterflow from airflow; said ribs extending rearwardly from either side of said opening to atmosphere, past said openings to said trunk compartment and extending laterally between said water-collecting trough and said openings to said trunk compartment to prevent the movement of water from said trough through said openings and into said trunk compartment upon deceleration of said automobile.

4. In a ventilation system for an automobile passenger compartment of the type having an uninhibited airflow path between the atmosphere and said passenger compartment, an opening to atmosphere in the exterior of the automobile located in a neutral pressure area as produced by airflow during automobile movement to allow alternate two-way airflow into or from said passenger compartment in response to a pressure differential between atmosphere and the passenger compartment, the improvement comprising: a trunk compartment rearwardly of said passenger compartment; a trunk compartment deck lid covering said trunk compartment and having spaced interior and exterior panels which define a deck lid flow path therebetween; said interior panel sloping downward from a front edge portion to a rear edge portion of said deck lid; said opening to atmosphere being through said exterior panel of said deck lid and laterally centrally located on said deck lid rearward of said front edge portion; dual openings to said trunk compartment extending through said interior panel of said deck lid and located laterally to either side of said opening to atmosphere; the ratio of the area of said openings to the trunk compartment to the area of said opening to atmosphere being greater than 1.4; a water-collecting trough formed along the rear edge portion of said deck lid between said panels at an elevation below said openings; water separation means including ribs formed in said interior panel and offset toward said exterior panel of said deck lid for providing two curved airflow paths between said opening to atmosphere and said openings to said trunk compartment to separate waterflow from airflow; said ribs extending rearwardly from either side of said opening to atmosphere, past said openings to said trunk compartment and extending laterally between said water-collecting trough and said openings to said trunk compartment to prevent the movement of water from said trough through said openings and into said trunk compartment upon deceleration of said automobile.

* * * * *